Figure 1:
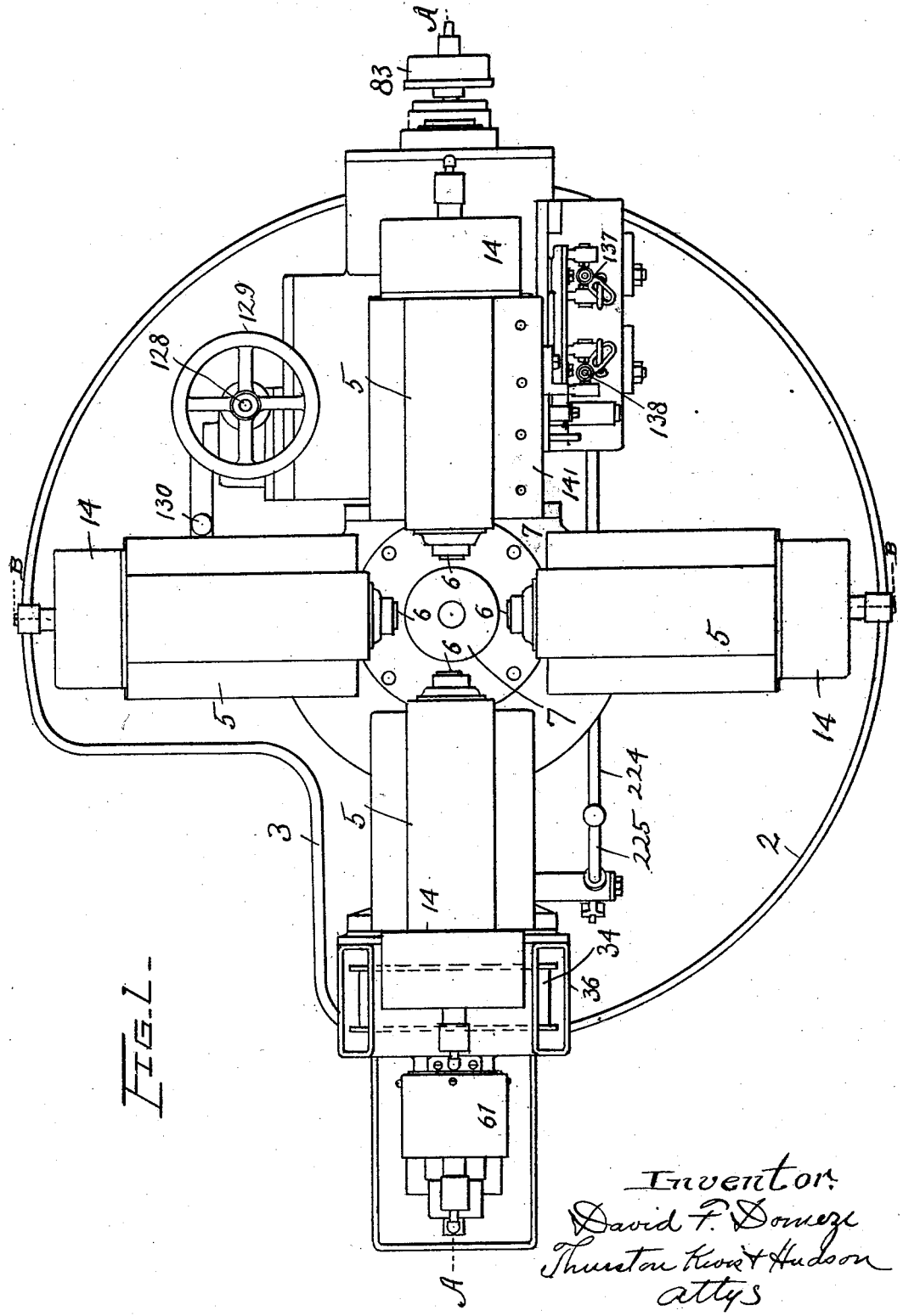

Oct. 13, 1931. D. F. DOMIZI 1,826,867
MULTIPLE SPINDLE MACHINE
Filed Oct. 24, 1924 14 Sheets-Sheet 1

Inventor:
David F. Domizi
Thurston Knox & Hudson
attys

Oct. 13, 1931. D. F. DOMIZI 1,826,867
MULTIPLE SPINDLE MACHINE
Filed Oct. 24, 1924 14 Sheets-Sheet 5

Oct. 13, 1931.  D. F. DOMIZI  1,826,867
MULTIPLE SPINDLE MACHINE
Filed Oct. 24, 1924    14 Sheets-Sheet 6
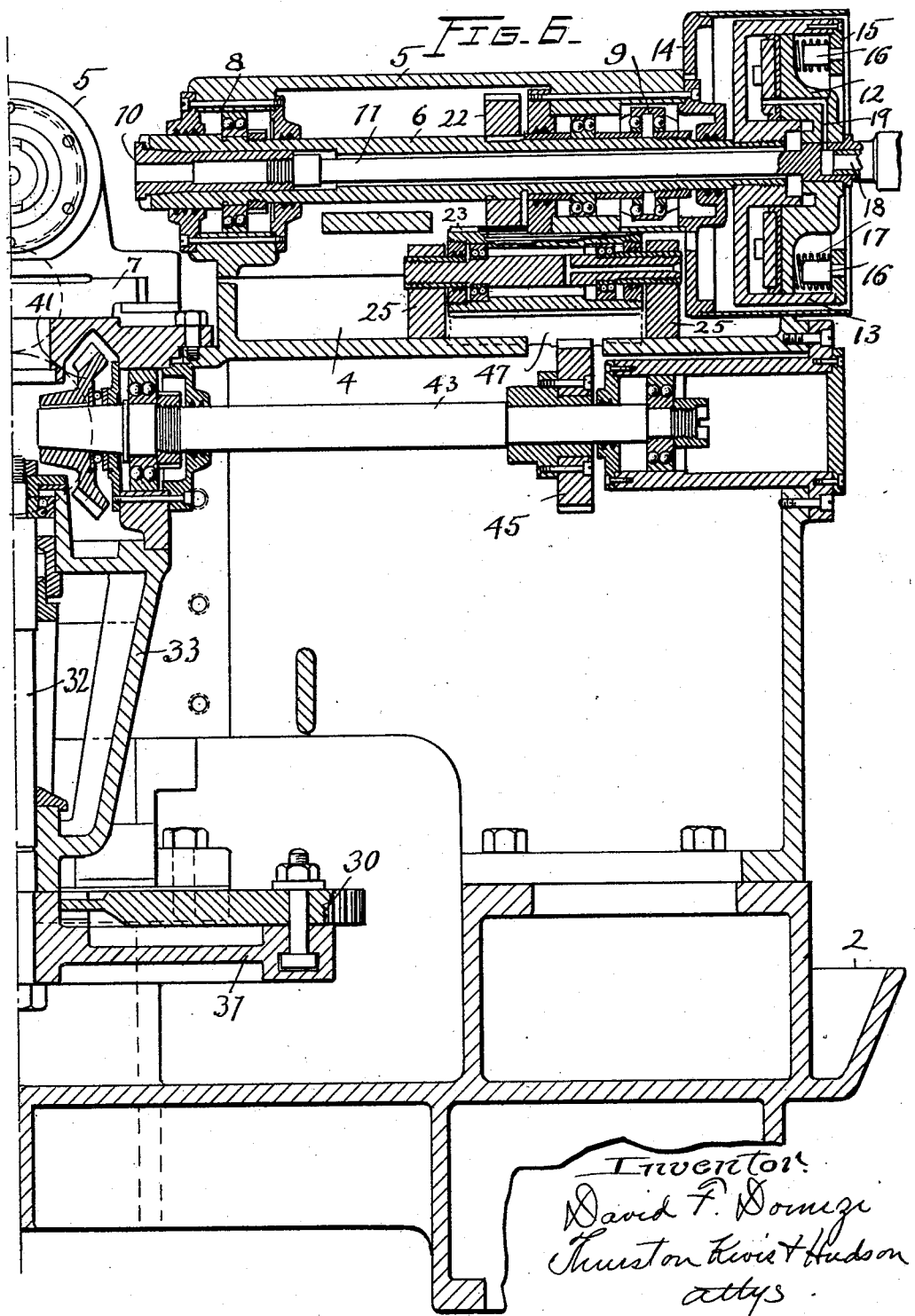

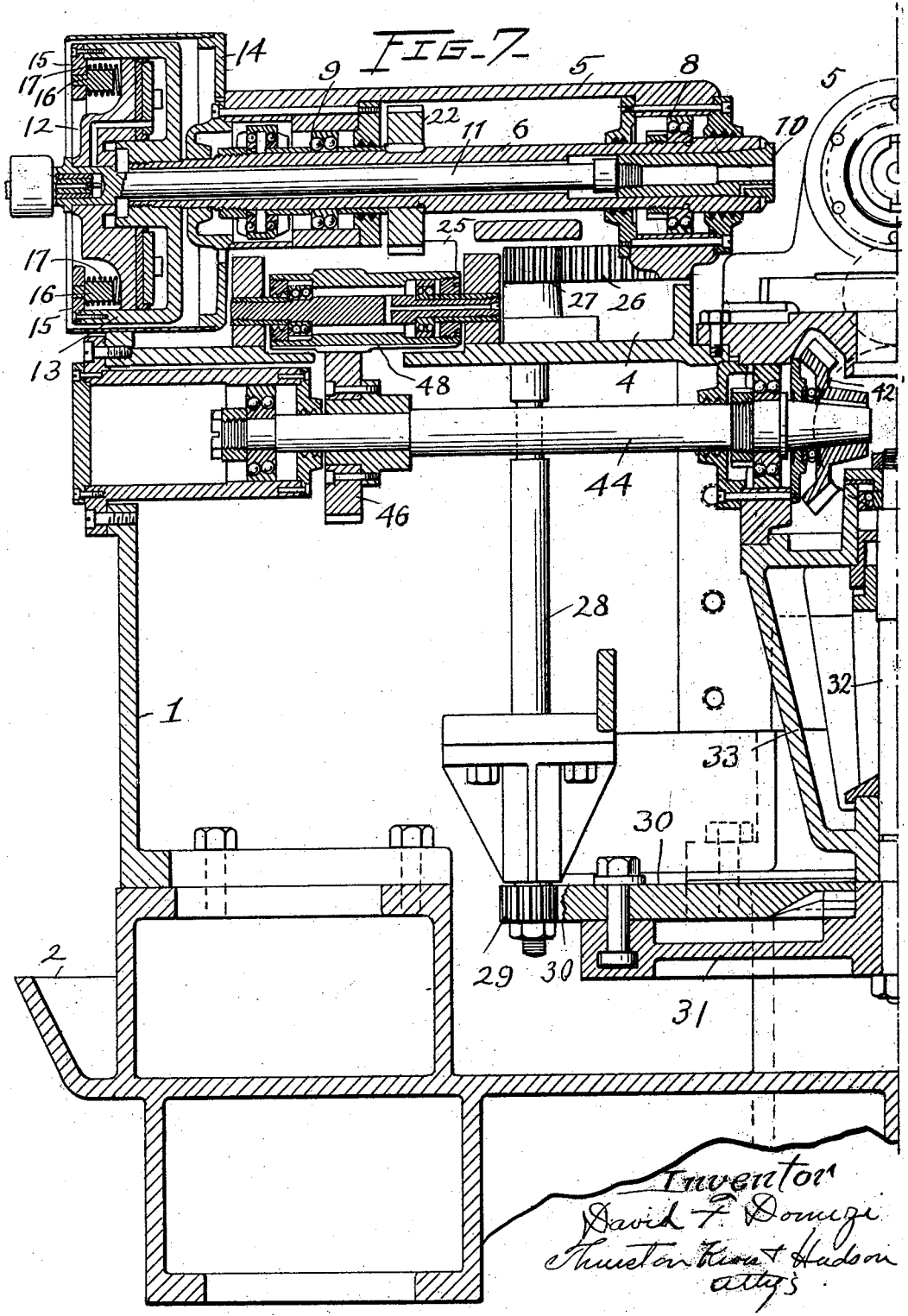

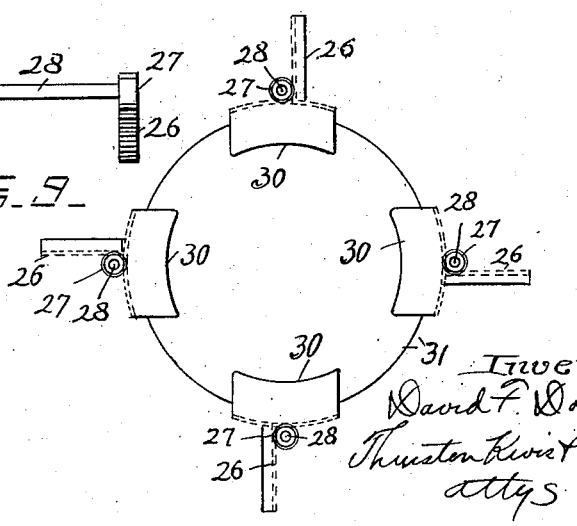

Oct. 13, 1931.  D. F. DOMIZI  1,826,867
MULTIPLE SPINDLE MACHINE
Filed Oct. 24, 1924  14 Sheets-Sheet 9
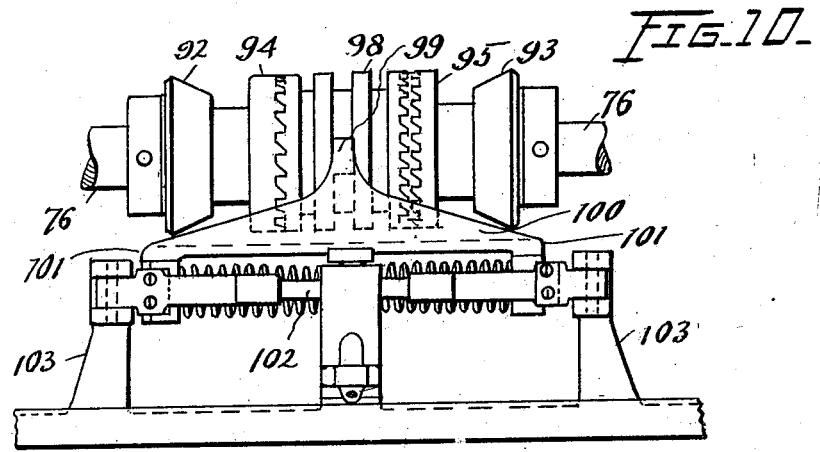

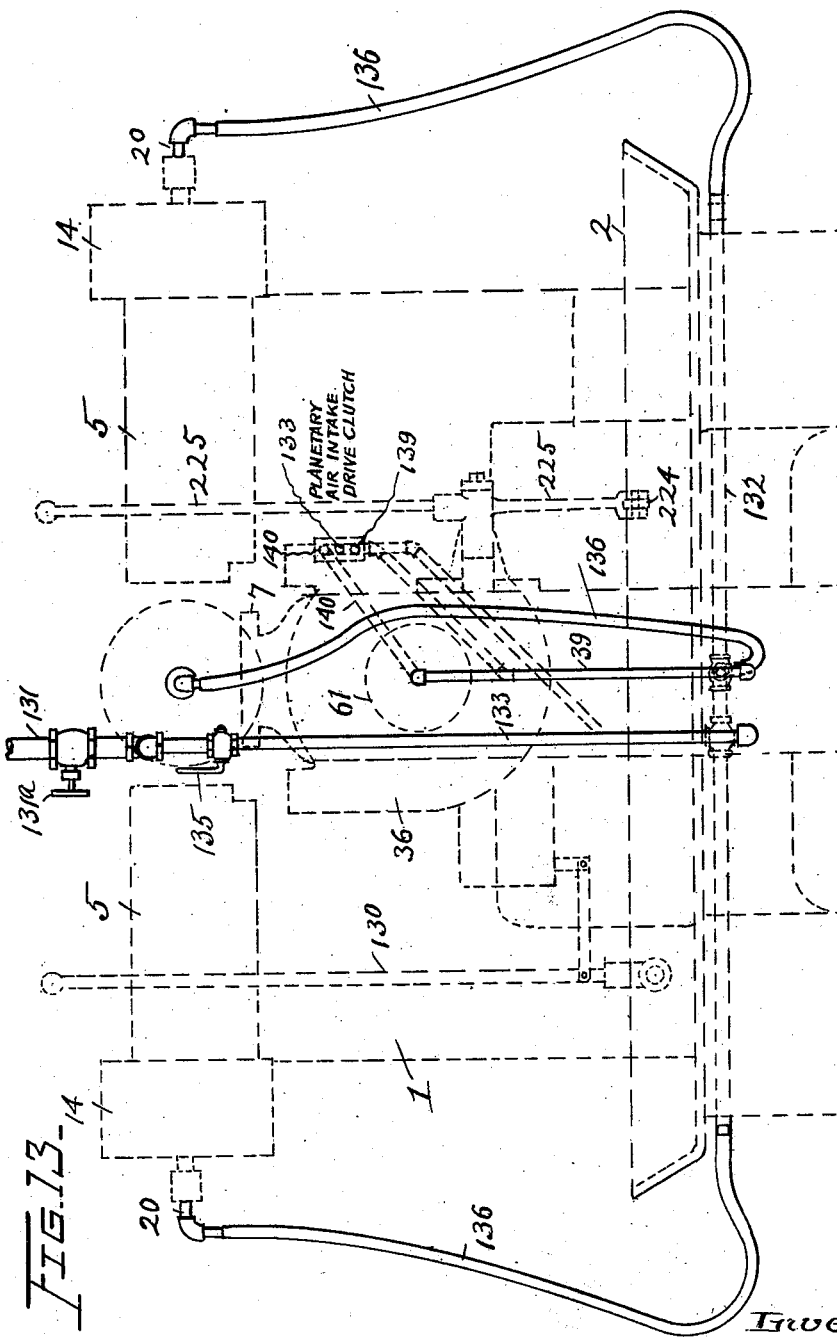

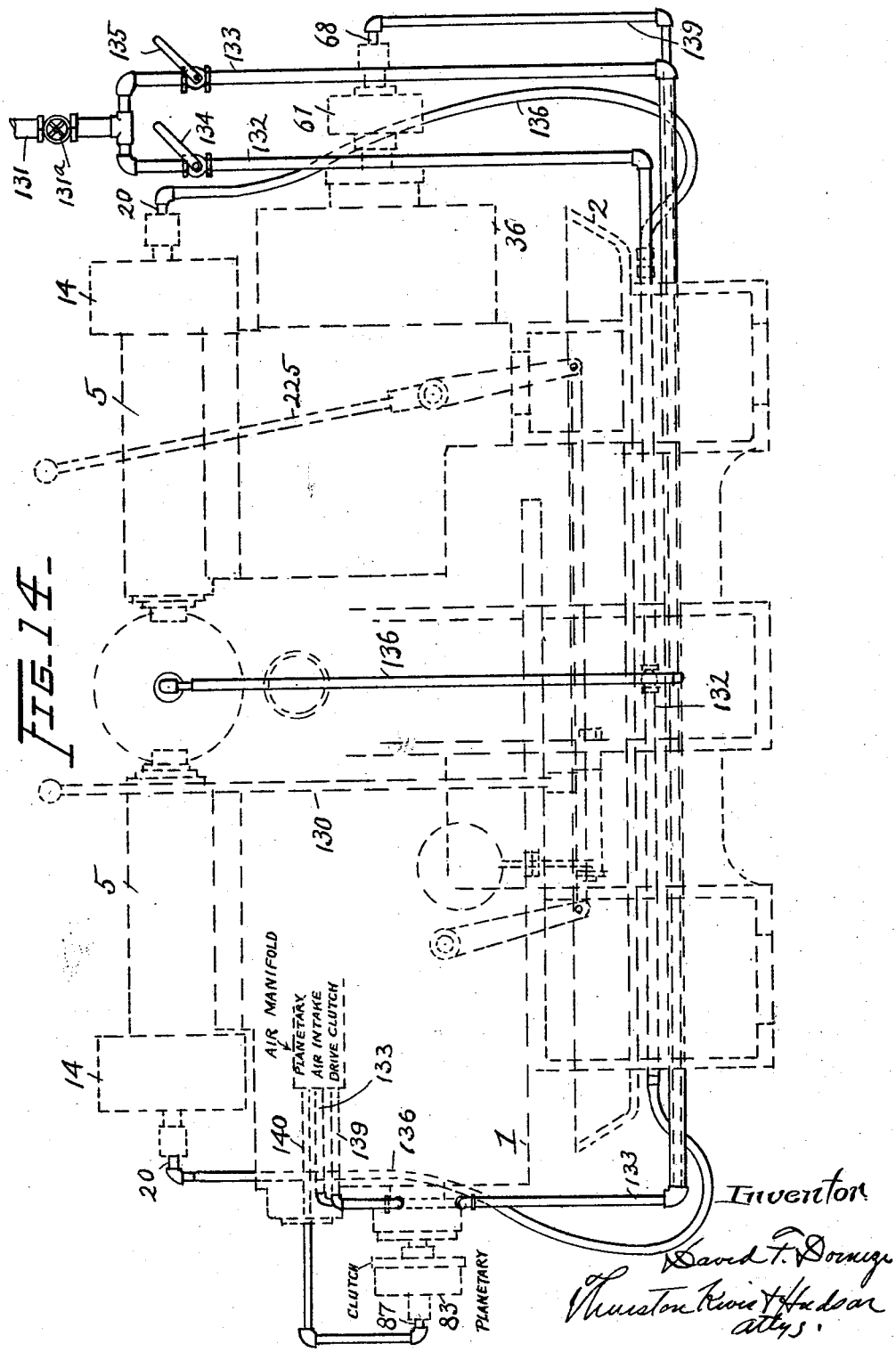

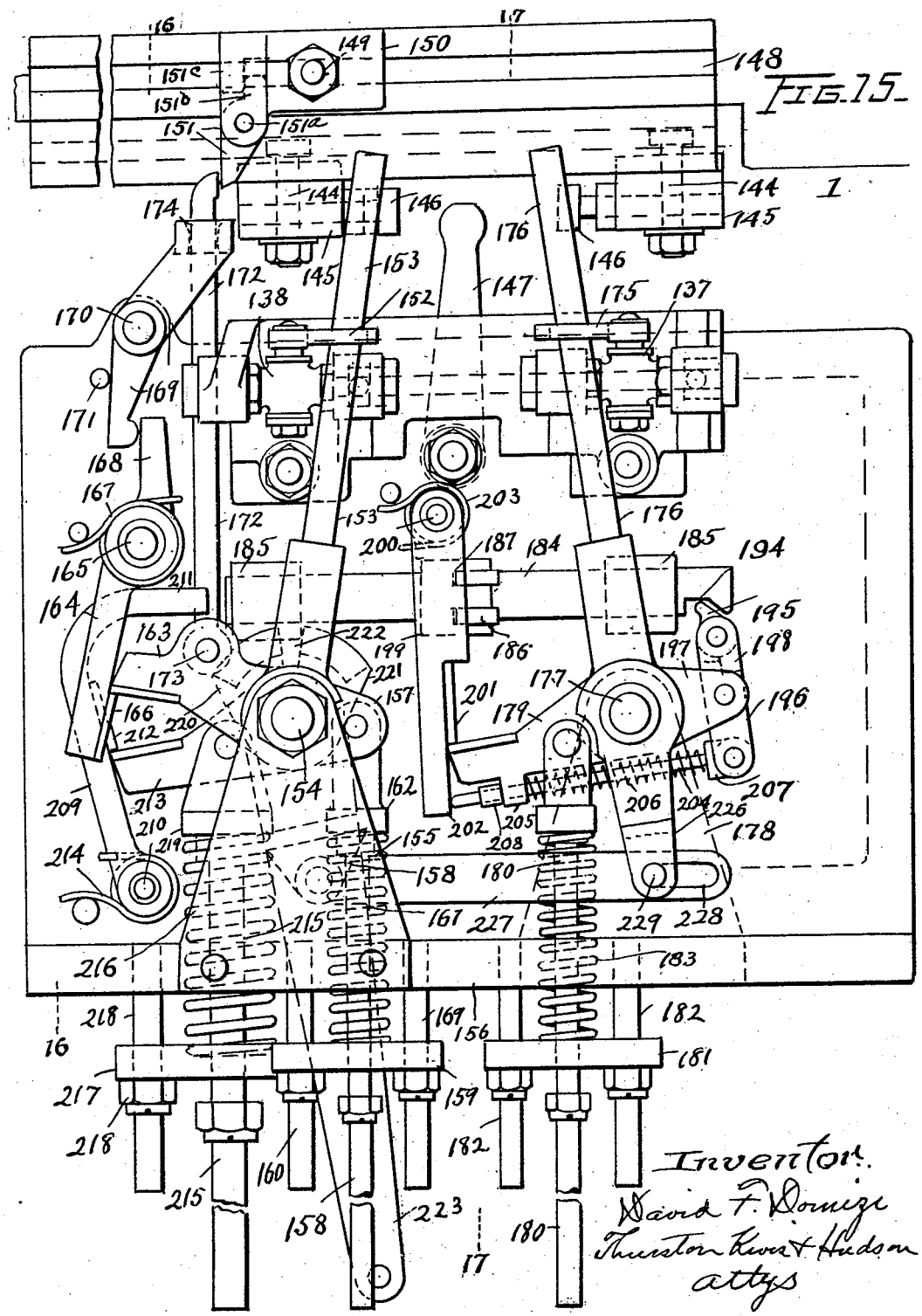

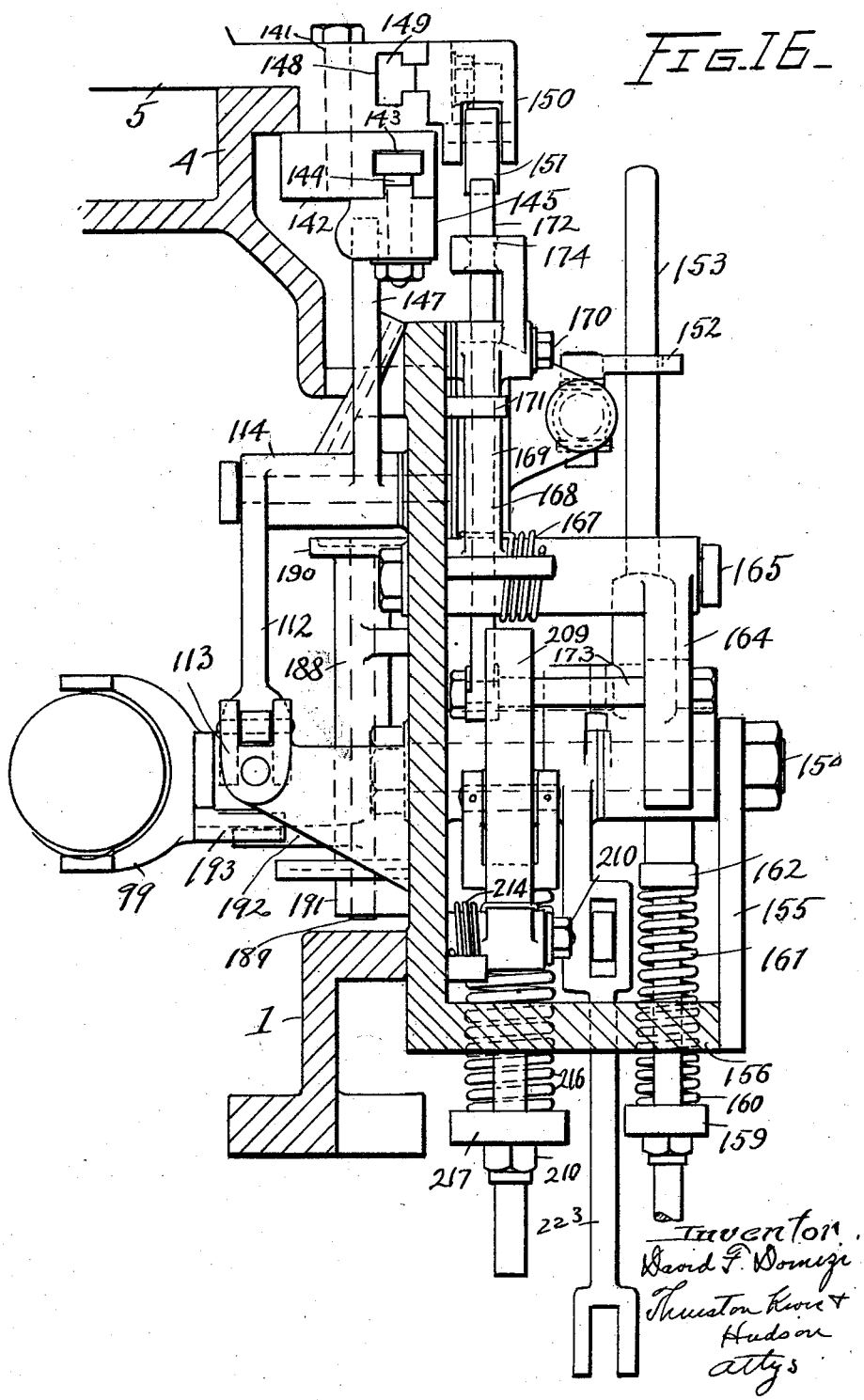

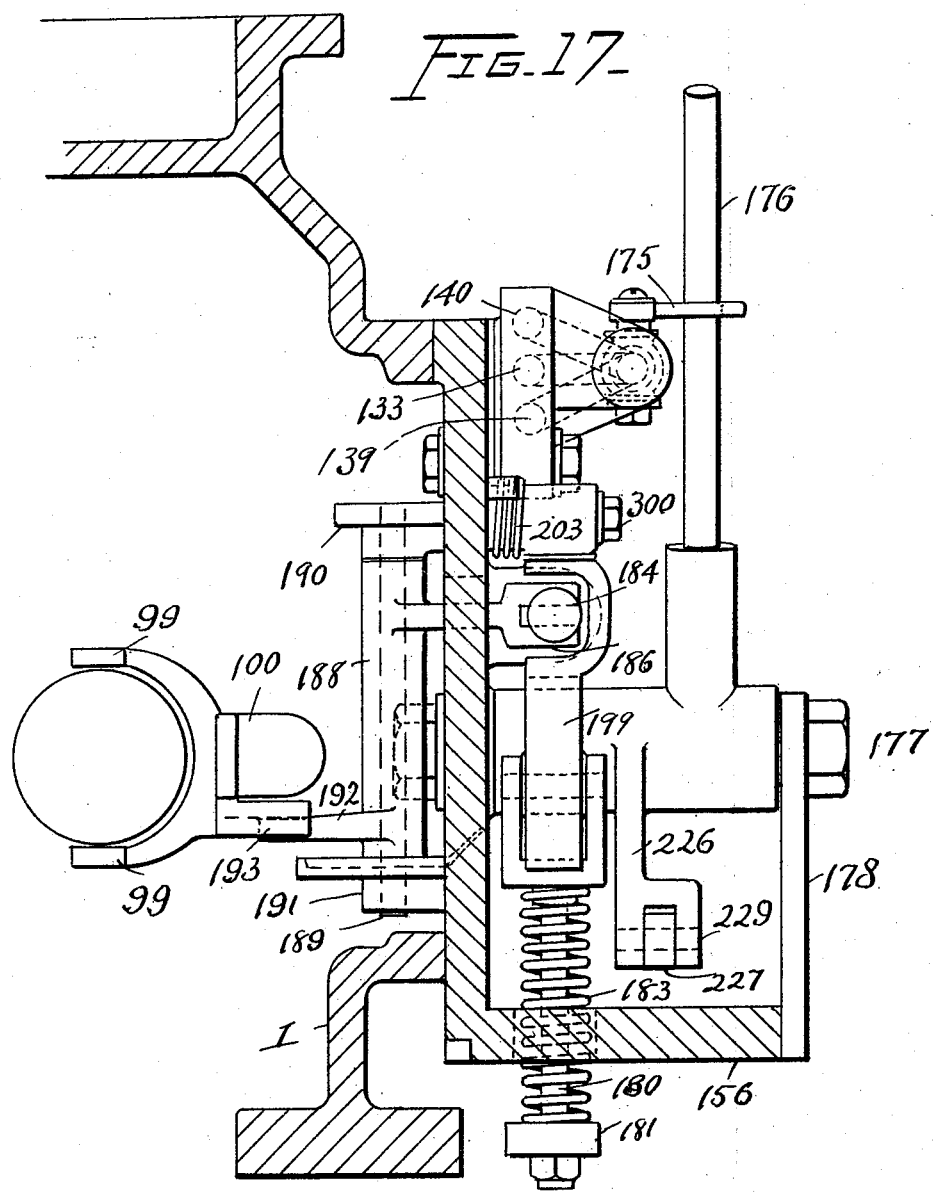

Patented Oct. 13, 1931

1,826,867

UNITED STATES PATENT OFFICE

DAVID F. DOMIZI, OF CLEVELAND, OHIO

MULTIPLE SPINDLE MACHINE

Application filed October 24, 1924. Serial No. 745,571.

The present invention relates to a metal working machine for cutting, drilling, turning or similar operations and more particularly to a multiple spindle machine having a series of longitudinal movable rotary spindles radially disposed with respect to a common center and movable longitudinally toward and from said center, said spindles being adapted to receive tools which operate simultaneously upon a piece of work secured at the common center toward which the spindles move. Various forms of cutting tools may be employed depending upon the character of the operations to be performed upon the work, the machine being particularly adapted for drilling and turning operations.

The present invention resides in the mechanism by which the spindles are simultaneously driven and simultaneously fed toward and from the work, the means for controlling said driving and feeding mechanisms, the tool holding chucks and the means for simultaneously operating the chucks to secure or release the tools.

The present invention has for an object to provide in a machine of the character referred to, automatic controlling means associated with the driving elements for reversing the feed movements of the spindles at the completion of the inward stroke and for automatically stopping the machine upon completion of the outward stroke.

A further object is to provide means for varying the speed of rotation of the spindles automatically as they are fed to the work and in addition to provide means whereby the speed changing device may be operated at any desired point in the feed movement.

A further object is to so control the feed mechanism that a spindle may be given a relatively rapid feed movement up to the point where the work is engaged, a slower feed movement during the operation upon the work and a relatively rapid return movement.

A further object is to provide a trip operated controlling mechanism controlled by the movements of a spindle head for varying the rate of feed, for reversing the direction of the linear movement and stopping the machine at the end of the return movement, all parts being automatically returned to a position such that the machine may again be started into operation by the actuation of a single controlling lever.

A further object is to provide fluid pressure actuators for the various devices controlling the operation of the driving and feeding mechanisms, together with automatically actuated valves for controlling the operation of the actuators.

A further object is to provide fluid pressure operated chuck setting devices and a common source of pressure supply for said setting devices whereby the tools may be simultaneously locked or released.

With the above and other objects in view, the invention may be said to comprise the machine illustrated in the accompanying drawings hereinafter described and particularly set forth in the appended claims, together with such variations and modifications thereof as will be apparent to one skilled in the art to which the invention appertains.

Figure 2:
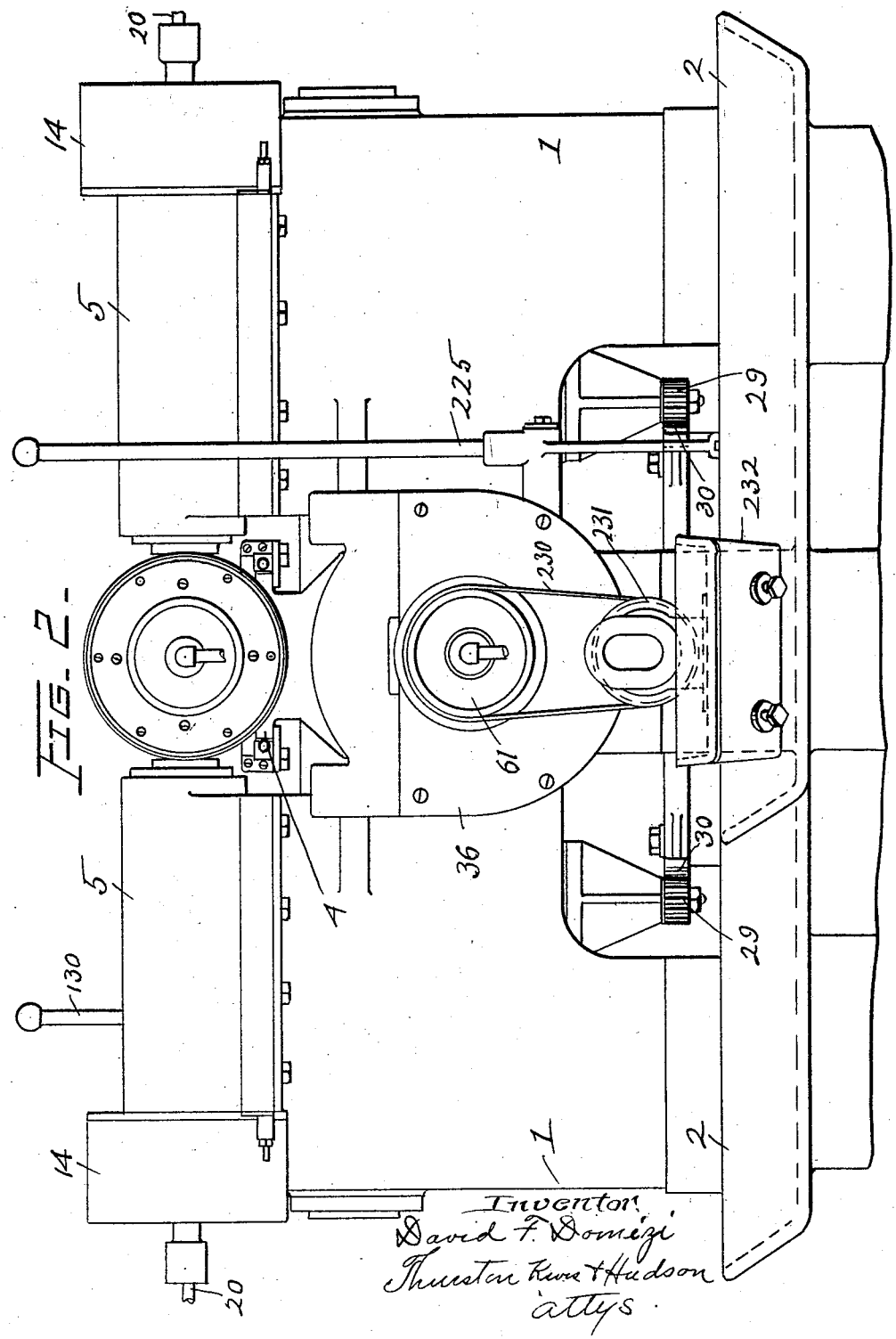
Figure 3:
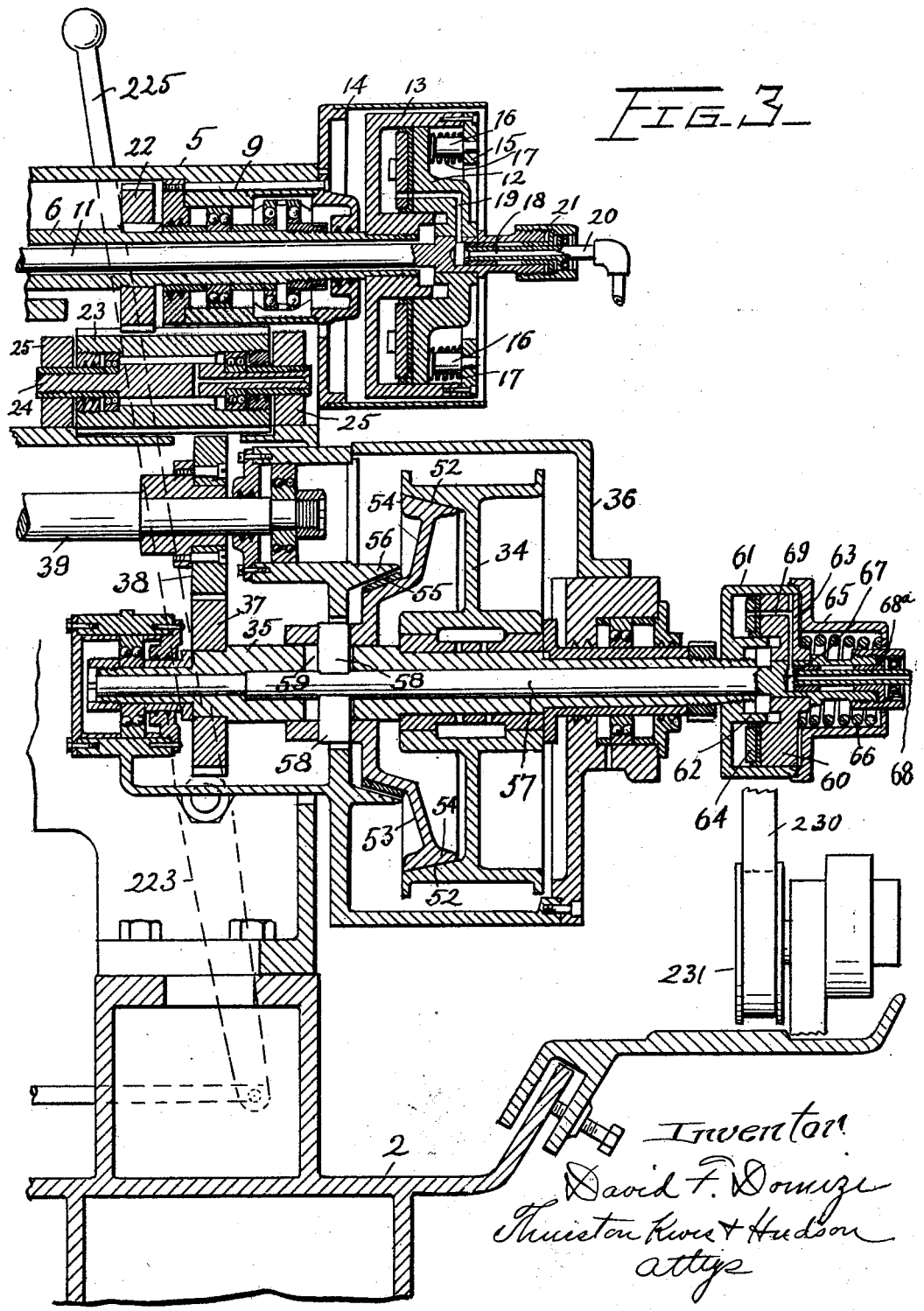
Figure 4:
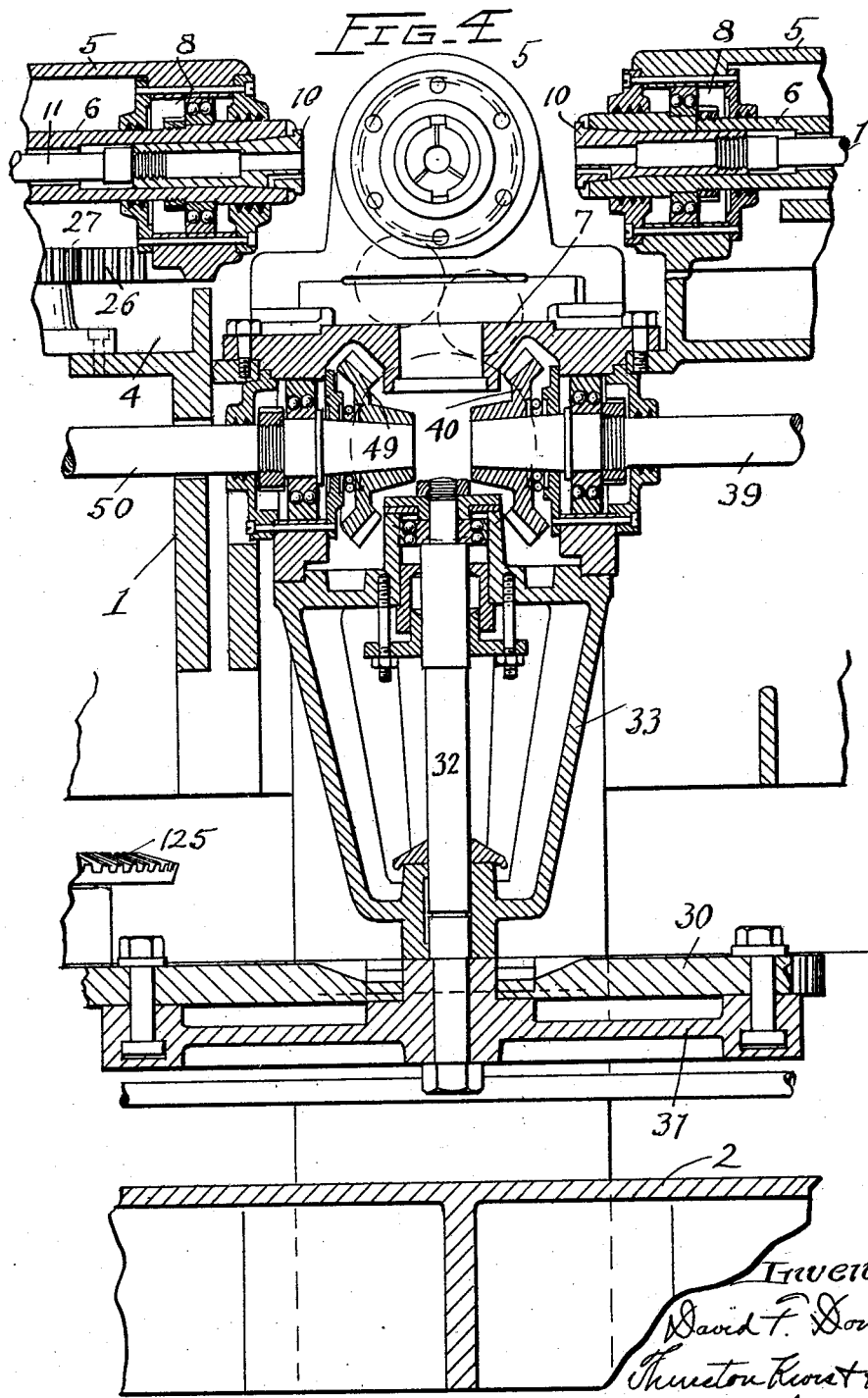
Figure 5:
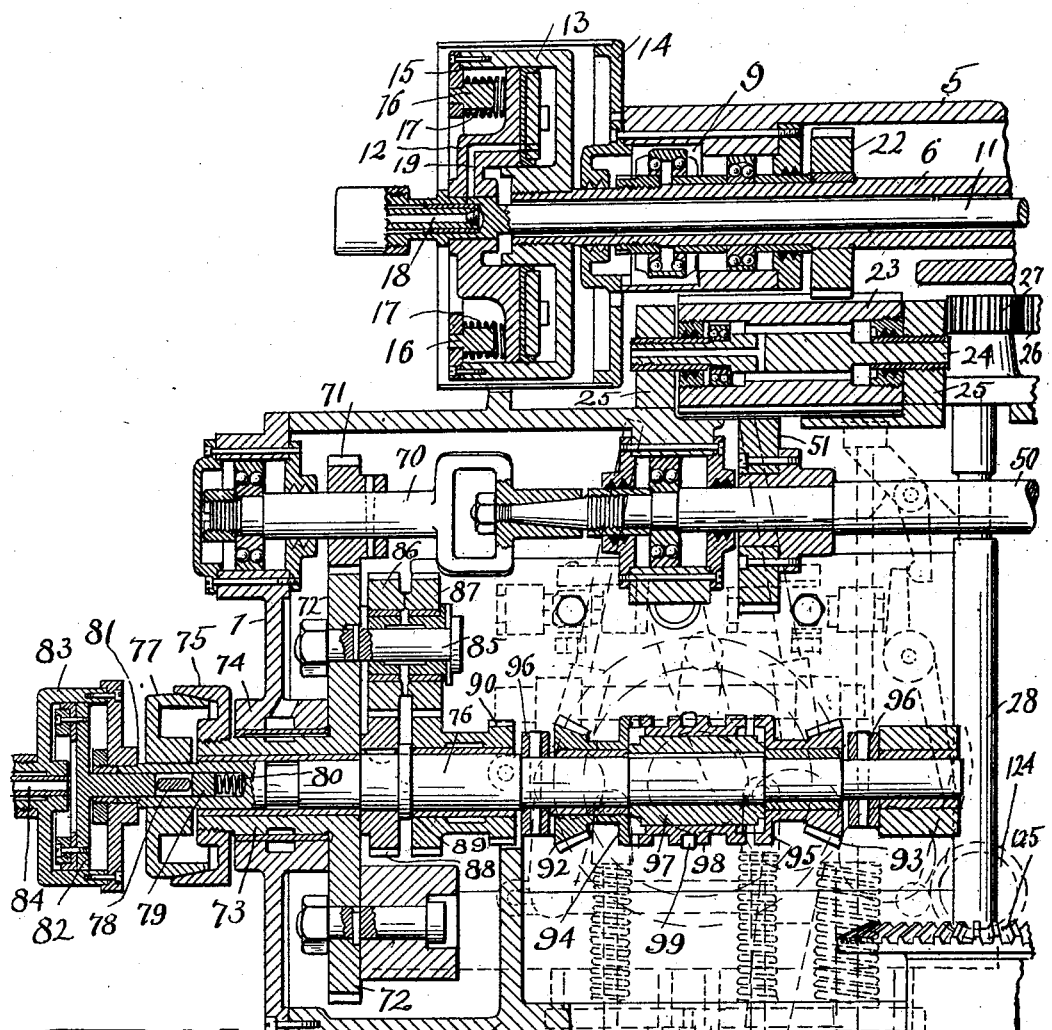
Figure 16:
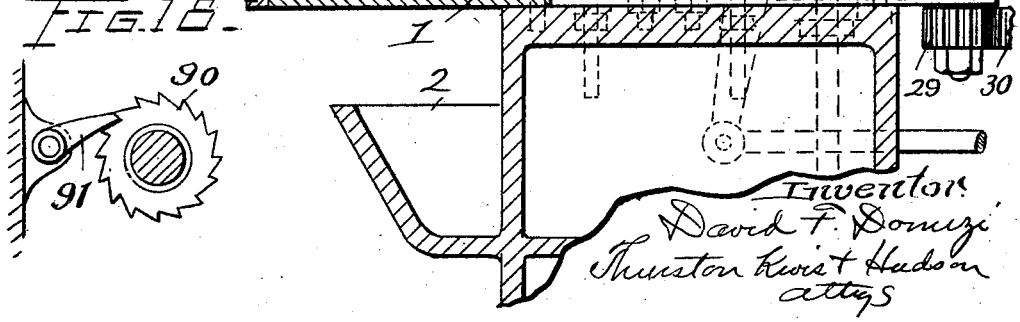

Reference should be had to the accompanying drawings forming a part of this specification in which Fig. 1 is a top plan view of the machine; Fig. 2 is a side elevation of the machine looking toward the right in Fig. 1; Figs. 3, 4 and 5 are vertical sections taken on the line A—A in Fig. 1; Fig. 3 showing the main spindle head at the left in Fig. 1, the main driving pulley beneath said spindle and the gearing connecting said pulley to the adjacent spindle, Fig. 4 showing the inner ends of the spindle heads and the gearing through which the remaining spindles are simultaneously driven, together with the segment disk through which the feed movements are imparted simultaneously to the heads, and Fig. 5 showing the spindle head at the right in Fig. 1, the gearing for driving the spindle in said head and the planetary and reversing gears through which the feed mechanism for the heads is driven; Figs. 6 and 7 are vertical sections taken on the line B—B which is at right angles to the line A—A in Fig. 1; Figs. 6 and 7 showing vertical sections through the two heads disposed at right angles to those shown in Figs. 3, 4 and 5, together with the gearing for driving the spindles carried by said heads; Fig. 8 is a diagrammatic development of the gearing for driving the spindles and shifting the heads; Fig. 9 is a diagrammatic plan view of the segment disks, vertical shafts actuated thereby and the racks carried by the heads which are engaged by pinions fixed to the vertical shafts; Fig. 10 is a top plan view of the reversing mechanism in the gear train through which the spindle head shifting mechanism is operated; Fig. 11 is a side elevation of the reversing mechanism showing the spring actuated trip device through which the clutch is shifted; Fig. 12 is a transverse section showing the trip actuating lever in elevation; Fig. 13 is a side elevation of the machine showing the air pipe connections for the chucks and clutches; Fig. 14 is a rear elevation of the machine showing the air pipe connections; Fig. 15 is a side elevation on an enlarged scale showing the automatic actuating means for the trip controlled reversing mechanism and the automatically controlled mechanism for actuating the valves controlling the supply of air to the main drive and planetary clutches; Fig. 16 is a transverse section on line 16—16 of Fig. 15; Fig. 17 is a transverse section on line 17—17 of Fig. 15; Fig. 18 is a detail view showing the pawl and ratchet of the planetary change speed mechanism.

Referring to the accompanying drawings, the supporting frame 1 of the machine has a circular base portion 2 formed to provide a drip pan beneath substantially the entire mechanism, the base portion having a reentrant portion 3 at one side thereof to provide an operator's station convenient to the controlling levers and to the work support. The frame 1 at the top thereof is provided with radially disposed guideways 4 upon which the spindle heads 5 are slidably mounted. As shown herein there are four radially disposed heads which are spaced 90° apart, each of the heads being provided with a radially disposed spindle 6, the spindle 6 projecting beyond the inner ends of the heads and adapted to receive suitable tools which operate simultaneously upon a piece of work secured to the centrally disposed work support 7.

These spindle heads 5 are identical in construction and the corresponding parts of each of the spindles are designated throughout the drawings by the same reference numerals. The spindles 6 are mounted axially of the heads 5 and are supported therein by inner and outer bearings 8 and 9. The spindles 6 are hollow from end to end and are provided at their inner ends with a tapered opening to receive conical clamping chucks 10 which when forced into the tapered openings in the spindle, grip the shank of a tool and securely hold the tool in place. The chucks 10 are drawn into the tapered opening and into clamping engagement with the tools by means of actuating rods 11 which are secured at their inner end to the chuck 10 and extend to the outer ends of the spindles. Beyond the outer ends of the spindles each of the rods 11 has rigidly attached thereto a piston 12 which fits within a cylinder 13 rigidly attached to the outer end of the spindle 6, the cylinder and piston rotating with the spindle 6. The cylinders 13 are enclosed within housings 14 fixed to the outer ends of the heads 5. Each cylinder 13 consists of an inner head secured to the spindle 6 and having a cylindrical outwardly projecting flange to the outer end of which is detachably secured an outer cover plate 15. The plate 15 has rigidly attached thereto a plurality of inwardly extending studs 16 upon which are mounted coil springs 17 which bear at their outer ends upon the cover plates 15 and at their inner ends upon the piston 12, the springs 17 acting to press the piston 12 toward the inner end of the cylinder and to shift the rod 11 inwardly in a direction to release the chucks 10. Each of the rods 11 has an axial bore 18 extending inwardly from its outer end to provide an air passageway and this passageway communicates with the space between the inner head of the cylinder 13 and the inner face of the piston 12 through a passage 19 formed in the piston 12. Air under pressure is supplied to the passageway 18 by means of a non-rotatable pipe 20 which extends into the outer end of the passage through a bushing 21. When air under pressure is admitted to the cylinders 13 the pistons 12 are forced outwardly in the cylinders and through the connecting rods 11 draw the chucks 10 into the tapered openings at the ends of the spindles 6 to securely clamp the tools.

Each of the spindles 6 has fixed thereto a spur gear 22 which meshes with an elongated spur gear 23 which is rotatably mounted upon a shaft 24 mounted in fixed supports 25 upon the top of the frame 1. The gear 22 moves with the spindle 6 as the same is moved longitudinally toward and from the work and during such movement slides along the elongated horizontally disposed gear 23.

For simultaneously shifting the heads toward and from the work each of the spindle heads 5 are provided with a rack 26 formed along the lower edge thereof which is engaged by a pinion 27 fixed to the upper end of a vertical shaft 28 as shown in Figs. 5, 7 and 8. The shafts 28 are journaled in fixed bearings in the frame 1 and have fixed to their lower ends, pinions 29 which mesh with gear segments 30 attached to the periphery of a centrally mounted disk 31 which is carried by a vertical shaft 32 which is supported at the center of the machine by suitable bearings in a supporting spider 33. The shafts 28 are simultaneously operated to feed the heads 5 toward the work and to withdraw the heads from the work by means of the common actuating disk 31.

As best shown in Figs. 3 and 8, the entire mechanism is driven from a main driving pulley 34 which is loosely mounted upon a shaft 35 and is enclosed within a housing 36 secured to the side of the frame 1, the housing 36 being provided with openings in the top thereof through which a driving belt from an overhead drive shaft may pass. The pulley 34 drives the shaft 35 through a suitable clutch which will be hereinafter described and the shaft 35 has fixed thereto adjacent its inner end a gear 37 which meshes with a gear 38 fixed to a radially disposed shaft 39, the gear 38 meshing with the elongated gear 23 associated with an adjacent spindle head 5 so that the spindle 6 of the adjacent head is continuously driven from the shaft 35. As shown in Figs. 4 and 8 the shaft 39 has fixed to its inner end a bevel gear 40 which meshes with beveled gears 41 and 42 which are fixed to the inner ends of aligned shafts 43 and 44 disposed at right angles to the shaft 39. Fixed to the outer ends of the shafts 43 and 44 are spur gears 45 and 46 which mesh with intermediate gears 47 and 48 which are in mesh with the elongated gears 23 which drive the spindles of the two heads disposed at right angles to the head which is disposed directly above the main driving pulley 34. The two beveled gears 41 and 42 mesh with a fourth beveled gear 49 which is fixed to the inner end of a radial shaft 50 which is aligned with the shaft 30 (see Figs. 4, 5 and 8). Adjacent its outer end the shaft 50 has fixed thereto a spur gear 51 which meshes with the elongated gear 23 associated with the spindle head which is directly opposite the spindle head over the driving pulley 34. Through the gearing above described all of the spindles 6 are driven from the shaft 35 at equal speeds.

A friction clutch is provided for connecting the driving pulley 34 to the shaft 35, the inner flange of the driving pulley 34 being formed to provide an inner conical face 52 which cooperates with the shiftable clutch member 53, the clutch member 53 having a conical peripheral portion 54 which fits within the conical face 52 of the pulley. It is desirable that when the clutch member 53 is disengaged from the driving pulley 34, that all of the spindles be stopped and locked against rotation and to this end the hub portion of the clutch member 53 is provided with external teeth 55 which engage with corresponding teeth of a fixed retaining member 56 formed integrally with the casing and adapted to be engaged with the teeth 55 of the clutch member when the same is shifted out of engagement with the pulley 34. The clutch member 53 is shifted into and out of engagement with the pulley 34 by means of a shifter rod 57 mounted within the shaft 35 which is hollow, the shifter rod 57 being connected to the hub of the clutch member 53 by means of a transverse pin or key 58 which extends through diametrically opposed slots 59 in the hollow shaft 35, the key 58 serving to lock the clutch member 53 against rotation on the shaft 35. The shifter rod 57 projects beyond the outer end of the hollow shaft 35 and has fixed thereto beyond the outer end of the shaft a piston 60 which fits within a cylinder 61 which is fixed to the outer end of the shaft 35. The cylinder 61 has an inner head portion fixed to the shaft 35 and an outwardly extending cylindrical flange in which the piston 60 fits, the inner head of the cylinder 61 having a cylindrical flange 62 within and concentric to its outer flange, the inner flange 62 extending into a circular groove 63 formed in the piston 60. An annular chamber is thus formed between the inner head of the cylinder 61 and the inner face of the piston 60, a suitable annular packing 64 being secured to the inner faces of the piston. The cylinder 61 has a detachable cup-shaped outer cover plate 65 within which is mounted a coil spring 66 which bears against the outer face of the piston 60 and serves to normally press the piston 60 inwardly toward the inner head of the cylinder and to hold the clutch member 53 out of engagement with the pulley. The outer end of the actuating rod 57 is bored to provide an axial air passageway 67 which receives a fixed air supply pipe 68 which extends through suitable bushings 68a and delivers air under pressure to the passage 67, the passage 67 being in communication with the annular chamber between the inner head of the cylinder 61 from the inner face of the piston 60 through a passage 69 formed in the piston 60. When air pressure is delivered to the cylinder 61 the piston 60 is moved outwardly and through the rods 67 shifts the clutch member 53 into engagement with the pulley 34 to establish driving connection between the driving pulley and the shaft 35 from which the spindles 6 are simultaneously driven.

The spindle head feed mechanism, as well as the spindle drive mechanism, is driven from the main driving shaft 35 and to this end the shaft 50 has rigidly attached to its outer end an extension 70 to which is fixed a spur gear 71 which meshes with the large gear 72 of a planetary change speed mechanism. The gear 72 has an outwardly extending hub 73 which is journaled in a boss 74 formed in the outer wall of the frame, the hub 73 projects to the outer side of the bearing boss 74 and has fixed thereto a clutch member 75. Journaled at its outer end within the hub 73 and at its inner end in a suitable fixed bearing adjacent the center of the machine is a shaft 76 which carries a clutch member 77 adapted to be shifted into and out of engagement with the clutch member 75 to connect the shaft 76 to the gear 72, or to disconnect the shaft therefrom. Clutch member 77 is keyed to shaft 76 by means of a key pin 78 which extends through a diametrical slot in the shaft. The inner side of the key 78 is engaged by a plunger 79 mounted within the shaft 76 which has an axial bore extending inwardly a short distance from its outer end, the plunger 79 being pressed outwardly by coil spring 80 interposed between the inner end of the bore and the plunger 79, the spring 80 serving to normally hold clutch member 77 out of engagement with the clutch 75. The inner side of the key 78 is engaged by a plunger 81 which extends inwardly from a piston 82 which is mounted within a cylinder 83 fixed to the outer end of the shaft 76. The cylinder 83 has an axial aperture to receive a stationary air pipe 84 which delivers air under pressure to the interior of the cylinder between the piston 82 therein and the outer head, suitable packing being interposed between the air pipe 84 and rotating cylinder head to prevent leakage of air. When air is admitted through the pipe 84 into the cylinder 83 pressure is exerted upon the piston 82, forcing the same inwardly in opposition to the spring 80 and shifting the clutch member 77 into engagement with the clutch member 75 and locking the large gear 72 to the shaft. The gear 72 has rigidly secured thereto between its hub and periphery a stub shaft 85 which is parallel with the shaft 76 upon which the gear 72 is mounted, and rotatably mounted upon the stub shaft 85 are integral inner and outer spur gears 86 and 87 which mesh respectively with gears 88 and 89 mounted on the shaft 76, the gear 88 being fixed to the shaft 76 and the gear 89 being loosely mounted on the shaft. The inner gear 89 on the shaft 76 has an inwardly extending hub upon which is formed a ratchet 90 which is engaged by a pawl 91 pivoted to the frame (see Fig. 18).

When the shaft 76 is clutched to the large gear 72 the gear 72 and gear 88 which is fixed to the shaft 76, rotate in unison about the shaft 76 and the gears 86 and 87 are locked against rotation upon the shaft 85. Since the gear 87 cannot rotate upon its shaft, the gear 89 which is loose upon the shaft 76 is caused to rotate with the gears 72 and 88 and with the shaft 76, the direction of rotation being such that the pawl 91 rides over the teeth of the ratchet 90. When the clutch element 77 is disengaged from the clutch element 75 by release of the air pressure within the air cylinder 83, the shaft 76 is released from the gear 72 and the gear 86 travels around the gear 88 fixed to the shaft and rotates upon its shaft 85. The rotation which would normally be imparted to the gears 86 and 87 tends to rotate the loose gear 89 in a direction opposite that in which it is rotated when the shaft 76 is clutched to the gear 72, rotation of the gear 89 in the reverse direction being prevented, however, by the pawl 91 which engages the teeth of the ratchet 90. Therefore, the gear 89 is held against rotation and as the gear 72 rotates the gear 87 rolls on the stationary gear 89. The gear 87 is provided with a greater number of teeth than the gear 86, which is fixed thereto, so that as the gear 87 rolls about the fixed gear 89 the shaft 76 is driven by the gear 86 meshing with the gear 88 fixed to the shaft 76, the rotation of the shaft 76 when so driven being in the same direction but at a much lower rate of speed than when the shaft 76 is driven directly through the main gear 72. Means is thus provided for changing the rate of feed of the spindle heads 5 by disengaging the clutch element 77 from the clutch element 75 whereby the spindles may be rapidly advanced until the tools engage with the work and may then be advanced at a much lower rate of speed while the tools are in engagement with the work.

To provide for reversal of the linear movement of the spindle heads a reversing gear is associated with the shaft 76 inwardly of the planetary change speed gearing. This reversing gear includes a pair of oppositely facing bevel gears 92 and 93 which have inwardly extending hubs 94 and 95, the inner ends of which are provided with clutch teeth, the gears 92 and 93 being held against longitudinal movement on the shaft 76 by collars 96 fixed to the shaft and engaging the outer sides of the gears and an inner sleeve 97 fixed to the shaft between the gears, the ends of the sleeve 97 engaging the inner ends of the hubs 94 and 95. Slidably keyed to the sleeve 97 is a circumferentially grooved clutch sleeve 98 provided with teeth at its opposite ends adapted to engage with the teeth carried by the hubs 94 and 95, so that by shifting the clutch sleeve either of the beveled gears may be clutched to the shaft 76. A circumferential groove in the clutch slide 98 is engaged by a fork 99 extending from a sliding shifter frame 100 which has bearings 101 slidably mounted upon a rod 102 which extends parallel to the shaft 76 and is secured to brackets 103 mounted upon the frame 1.

The guide rod 102 has a circumferentially grooved collar 104 slidably mounted thereon between the end bearings 101 of the shifter frame and interposed between the collar 104 and the bearings 101 are coiled springs 105 and 106 which encircle the guide rod 102 and are mounted at their ends upon projections 107 extending inwardly from the bearings 101 and on projections 108 extending outwardly from opposite ends from the collar 104, a pair of latches 109 are pivoted at their outer ends upon the brackets 103 and extend inwardly over the bearing members 101. The latches 109 being each provided with a projecting shoulder 110 upon their under sides which engage the outer faces of the bearing members 101 to lock the clutch shifter slide 100 either in a position in which the gear 92 is clutched to the shaft 76 or in a position in which the gear 93 is clutched to the shaft 76, the latches 109 dropping by gravity into locking position when the slide 100 is shifted to the limit of its movement in either direction. The inner ends of the latch members 109 have inclined cam faces 111 by means of which the latches are lifted upon movement of a shifter arm 112 which has a fork 113 at its lower end engaging in the peripheral groove of the collar 104, the arm 112 extending downwardly from a sleeve 114 which is rotatably mounted upon a spindle 115 fixed to the frame 1 and having laterally extending projections 116 which engage with the cam faces 111 of the latches to release the same upon movement of the arm 112 toward a latch which is in engaging position.

It will be noted that when the clutch sleeve 98 is in engagement with one of the hubs 94 or 95, the latch 109, which holds the clutch sleeve in engaging position, is at the end of the slide 100 toward which the slide must be shifted to release the clutch and to engage the same with the opposite gear, the arm 112 being alternately shifted in opposite directions by mechanism which will be hereinafter described. To alternately clutch the gears 92 and 93 to the shaft 76, the arm 112 is so shifted that it is always moved toward the latch 109 which is in locking position. The movement of the arm 112 causes the collar 104 to be moved toward the bearing member 101 which is engaged by the latch thus causing the spring 105 or 106 to be compressed between the collar 104 and the bearing member 101 engaged thereby. During the movement of the arm 112 in either direction the projection 116 engages with the cam face 111 of the latch which is in engaging position and lifts the latch out of engagement with the bearing member 101 with which it is engaged, whereupon the spring 105 or 106 which has been compressed by the movement of the collar 104 snaps the shifter frame 100 to its opposite limit of movement and the opposite latch 109 snaps into locking engagement with the opposite bearing member 101 to retain the slide in shifted position. Thus as the arm 112 is alternately swung in opposite directions the gears 92 and 93 are alternately clutched to the shaft 76. The two beveled gears 92 and 93 mesh with a large beveled gear 117, which is fixed to a horizontal shaft 118 from which the spindle feed mechanism is operated and as the beveled gears 92 and 93 are alternately clutched to the shaft 76, the shaft 118 is alternately driven in opposite directions and reversal of the direction of rotation of the shaft 118 causes the direction of movement of the spindles to be reversed. The shaft 118 at the end thereof opposite that upon which the gear 117 is mounted has fixed thereto a gear 119 which meshes with an intermediate gear 120 which in turn meshes with a second intermedite gear 121, which drives a gear 122 fixed to a horizontal shaft 123, the shaft 123 having fixed to its inner end a beveled gear 124 which meshes with a beveled gear 125 fixed to one of the vertical shafts 28 through which movement is transmitted from the large disc 31 to the radially disposed spindle heads 5.

As shown in Fig. 8 the shaft 123 carries a worm gear 126 at its outer end which meshes with a worm 127, which is at the lower end of a hand wheel shaft 128 to the upper end of which is attached the hand wheel 129, by means of which the spindle feed mechanism may be manually operated. The gear 126 is loose upon the shaft 123, but may be secured thereto by means of a suitable clutch not shown which is controlled by the hand lever 130 so that when desired the spindles may be shifted manually.

The chuck setting cylinders 13 at the outer ends of the heads 5, the main drive clutch operating cylinder 61 and the planetary change speed clutch operating cylinder 83 are all supplied with air under pressure from a main compressed air supply pipe 131 as best shown in Figs. 13 and 14 of the drawings. The air pipe 131 has a valve 131a therein by means of which the supply of air to the machine may be regulated or entirely cut off. The air is supplied to the various cylinders of the machine through two branch pipes 132 and 133 communicating with the main supply pipe 131. The branch pipe 132 being controlled by a manually operable valve 134, and the branch pipe 133 being controlled by a manually operable valve 135. The branch pipe 132 supplies air to the chuck setting cylinders 13 and is connected to each of the inlet pipes 20 by flexible branch conduits 136, the four chucks 10 being caused to simultaneously grip the tools when air is admitted to the cylinders 13 by opening the controlling valve 134. The branch pipe 133 supplies air to the main drive clutch cylinder 61 and to the planetary clutch cylinder 83, the supply of air to the cylinders 61 and 63 being controlled by automatically actuated valves 137 and 138 which are best shown in Figs. 15, 16 and 17. The pipe 133 terminating adjacent the portion of the frame 1 alongside the reversing and speed change mechanism and the valves 137 and 138 controlling the delivery of air from the supply pipe 133 to a pipe 139 disposed beneath the end portion of the pipe 133 and leading to the main drive clutch, and from the pipe 133 to a pipe 140 disposed above the same which leads to the planetary clutch cylinder 83, the arrangement of the valves being best shown in Figs. 15 and 17. As the valve 137 is opened and closed, the main driving clutch member 53 is engaged and disengaged from the driving pulley 34 and, as the valve 138 is opened and closed, the main gear 72 of the planetary gearing is clutched to and disengaged from the shaft 76 which drives the spindle feed mechanism.

The valves 137 and 138 are so controlled that the spindle heads are moved inwardly toward the work at a relatively rapid rate, the main drive clutch and planetary clutch being both engaged when the machine is started into operation. At the instant when the tool engages the work, the planetary clutch is automatically released, whereby during the operation of the tools upon the work, the spindles are fed at a relatively slow rate. Upon completion of the inward stroke of the spindles the feed mechanism is automatically reversed and the planetary clutch re-engaged so that the spindles are returned at a rapid rate and, upon completion of the outward movement of the spindle heads, the main driving clutch is disengaged, stopping the entire mechanism, the parts of the controlling mechanism being in such position when the machine is stopped that the machine may be again started and the above described operation repeated by shifting a controlling lever in one direction. The automatic controlling mechanism for causing the operation above described will now be explained, this mechanism being shown in detail in Figs. 15, 16 and 17.

One of the side flanges 141 of the spindle head 5 which is mounted directly above the planetary speed change mechanism and the reversing mechanism has a retaining plate 142 bolted to the under face thereof which engages with the underside of the flange of the guideway 4 and this retaining plate is provided on its underside with a longitudinally extending T-shaped slot 143 which receives the head of bolts 144 which carry abutment blocks 145 which have trip arm engaging heads 146 adjustably secured to their inner ends. The blocks 145 are secured to the plate 142 at points such that the distance between the heads 146 corresponds to the extent of inward and outward movement to be imparted to the spindle heads, the amount of movement of the heads depending upon the distance between the trip arm engaging heads 146 and this distance being regulable by adjusting the heads 146 in the blocks 145 or by adjusting the blocks 145 along the plate 142. The adjustable heads 146 engage with a trip arm 147 which extends upwardly from the sleeve 114 which carries the depending trip arm 112 which operates the reversing clutch. The outer abutment head 146 is so set that as the spindle head approaches the position at which it is desired to stop the feed movement, the outer head 146 engages with the trip arm 147, swinging arm 147 and with it the arm 112 in a direction to shift the reversing clutch sleeve 98 and reverse the direction of movement of the feed mechanism. The inner of the abutment heads 146 is so positioned as to engage with the trip arm 147 to again shift the reversing clutch sleeve 98 in the opposite direction at the point where the outward movement of the spindle heads is to be stopped.

The flange 141 of the head is provided along its outer edge with a T-shaped slot 148 which receives the head of a bolt 149 by means of which a slide block 150 is adjustably attached to the head. The slide block 150 has a depending trip arm 151 carried by a pivot pin 151a and having an upwardly extending lug 151b which is engageable with an abutment member 151c carried by the block 150 by which the movement of the lower end of the trip arm in an outward direction past vertical position is prevented, the trip arm 151 being designed to actuate a trip member during inward movement of the head and to ride over said trip member during outward movement of the head. The trip members mounted upon the spindle head in addition to actuating the reversing mechanism also cause the actuation of devices for shifting the two valves 137 and 138 which control the operation of the main drive and planetary clutches.

The valve 138 is provided with a laterally extending arm 152 through which extends the upper end portion of a lever 153 which is pivoted adjacent its lower end upon a transverse pivot bolt 154 which is secured between an outer bracket plate 155 and the wall of the frame 1, the frame 1 having an outwardly projecting flange 156 to the outer edge of which the bracket plate 155 is secured. The lever 153 has an integral relatively short laterally extending portion 157 adjacent the pivot from which is pivotally suspended a rod 158 which extends through and is slidably mounted in a plate 159 which is suspended from the flange 156. A coil spring 161 surrounds the rod 158 and bears at its lower end upon the plate 159 and at its upper end against an abutment 162 formed adjacent the upper end of the rod 158, the flange 156 being apertured to permit the rod 158 and spring 151 to extend therethrough. The spring 161 exerts its pressure in a direction to move the upper end of the lever 153 inwardly to move the valve 138 to a position in which communication between the supply pipe 133 and the pipe 140 leading to the cylinder 83 controlling the planetary clutch is cut off and in which the pipe 143 is open to atmosphere, the valve 138 being a three-way valve of the usual construction. Means are provided for releasably retaining the lever 153 in a position in which communication is established between the pipes 133 and 140 to supply pressure to the planetary clutch actuating cylinder 83, the spring 161 acting to release the pressure from the cylinder 83 and thereby release the planetary clutch when this retaining means is released.

For holding the lever 153 in the position in which the valve 138 is opened between the pipes 133 and 140, the lever 153 has a second arm 163 extending laterally therefrom opposite the arm 157 and this arm 163 is engaged by a spring latch 164 for retaining the arm 163 in its uppermost position in opposition to the spring 161. The latch member 164 is suspended from a pivot pin 165 projecting from the frame 1 and has a retaining plate 166 secured thereto adjacent its lower end to provide retaining shoulder for the end of the arm 163, the latch member 164 being pressed toward the arm 163 by means of a coiled spring 167. The latch 164 has an extension 168 above its pivot and this extension is engaged by the lower end of a trip lever 169 pivoted intermediate its ends upon a pin 170 projecting from the frame of the machine, the inward movement of the lower end of the lever 169 being limited by a stop pin 171, the lever 169 being held in engagement with the pin 171 when the latch 164 is in engaging position. A vertical trip rod 172 is pivoted at its lower end at 173 to the arm 163 and at its upper ends extend through an opening 174 in the upper end of the lever 169. The trip rod 172 has its upper end in the path of movement of the depending trip arm 151 which is so positioned that it engages with the trip rod 172 at the time when the spindle heads 5 reach the position at which the tools engage with the work.

When the machine is started into operation the valve actuating members are in the position shown in Fig. 15 of the drawings in which position both the main drive clutch and the planetary clutch are in engagement. The inward movement of the spindles from the time the machine is started into operation until the tools are brought to work engaging position being at the higher speed provided through the planetary gearing. When the trip arm 151 engages the trip rod 172, the rod 172 is rocked inwardly about its pivot swinging the lower end of the lever 169 outwardly and with it the upwardly projecting portion 168 of the latch 164 moving the lower end of the latch 164 inwardly to release the arm 163 whereupon the lever 153 is swung inwardly by the spring 161 to actuate the valve 138 to cut off the supply of pressure to the planetary clutch cylinder 83 and to release the pressure in said cylinder to permit the planetary clutch to be released by its spring. Upon release of the planetary clutch the feed mechanism is driven through the small gears 86 and 87 of the planetary gearing at a slower rate of speed while the tools are operating upon the work.

The valve 137 which is a three-way valve similar to the valve 138 has a laterally extending arm 175 through which extends an operating lever 176 which is pivoted on a horizontal bolt 177 connected between the cover plate of the machine frame and a bracket 178 secured to the outer edge of the flange 156. The lever 176 has an integral inwardly extending arm 179 adjacent the pivot from which is pivotally suspended a rod 180 which extends downwardly through the flange 156 and through a guide plate 181 suspended by bolts 182 from the flange 156. A coil spring 183 is mounted on a rod 180 and bears at its lower end upon the plate 181 and at its upper end against a shoulder formed on the rod 180 adjacent the upper end thereof, the spring 183 exerting its pressure in a direction to cause the lever 176 to shift the valve 137 to a position in which communication between the pressure supply pipe 133 and the pipe 139 leading to the main clutch operating cylinder 61 is cut off and the pipe 139 leading to the cylinder 61 is open to the atmosphere.

During the operation of the machine the lever 176 is held in the position shown in Fig. 15 in which the valve 137 is open between the supply pipe 133 and the pipe 139 leading to the main clutch operating cylinder 61 and the lever is held in this position against the tension of the spring 183 by trip devices which will be hereinafter described, the release of these trip devices being controlled by the actuation of the feed reversing mechanism. To provide for actuating of the valve lever controlling trip devices from the reversing clutch, a horizontally disposed trip rod 184 is slidably mounted in bearings 185 on the outer side of the cover plate of the machine frame and this rod is engaged adjacent its center by a forked arm 186 which engages in notches 187 upon the upper and lower sides of the rod 184. The forked arm 186 is integral with a vertically disposed sleeve 188 which is rotatably mounted upon a pintle 189 carried by upper and lower brackets 190 and 191 upon the inner side of the cover plate. Adjacent its lower end the sleeve 188 has an inwardly projecting arm 192 which engages in a channel 193 formed on the underside of the clutch shifter slide 100. Thus upon each actuation of the clutch shifter slide 100, the trip rod 184 is actuated.

The trip rod 184 has a notch 194 on its underside adjacent its outer end, the inner end of the notch 194 forming a shoulder which is adapted to engage a pivoted dog 195 carried by the upper end of a lever 196 which is pivoted intermediate its ends to an arm 197 projecting outwardly from the lever 176. The dog 195 has a projection 198 which engages with an abutment formed on the lever 196 to limit the outward movement of the upper end of the dog with respect to the lever 196. The upper end of the dog being free to swing inwardly so that when engaged by the outer wall of the notch 194 the dog will swing down out of the notch and will not actuate the lever. The inwardly extending arm 179 of the lever 176 is releasably retained in its lowermost position by means of a pivoted latch 199 which is suspended from a pivot 200, the latch having a plate 201 secured to its outer face to form a retaining shoulder for engaging the end of the arm 179 and a projecting portion 202 below the plate 201 extending below the arm 179, the latch 199 being held in engaging position by means of a coil spring 203 surrounding the pivot 200 and secured at its ends to the fixed frame and to the latch. The lever 196 has a rod 204 pivoted at its outer end thereto and supported adjacent its inner end by a bearing 205 secured to the underside of the arm 179. The coil spring 206 is mounted on the rod 204 and bears at its opposite ends upon the bearing member 205 and a shoulder 207 formed adjacent the outer end of the rod. The spring 206 tends to swing the lower end of the lever 196 outwardly and the lever 196 is normally held in a position such that the dog 195 at the upper end thereof projects into the notch 194 of the trip rod by means of a stop collar 208 fixed to the rod 204 which limits the outward movement of the rod 204 and the lever 196 by the spring 206. When the arm 179 is engaged by the latch 199 as shown in Fig. 15 of the drawings, the inner end of the rod 204 bears against the projecting lower end portion 202 of the latch 199 and when the inner abutment head 146 engages with the trip lever 147 upon completion of the inward movement of the heads to shift the reversing clutch, the trip rod 184 is shifted outwardly engaging the dog 195 and actuating the lever 196 to push the rod 204 inwardly to swing the latch 199 clear of the arm 179 of the lever 176.

The horizontally movable trip rod 184 in addition to operating the mechanism for releasing the lever 176 upon operation of the reversing clutch at the end of the outward movement of the feed, serves to control the actuation of a device for returning the lever 153 to its original position upon actuation of the reversing clutch at the end of the inward movement of the head. The inner end of the rod 184 when shifted inwardly engages with a latch member 209 which is pivoted at its lower end at 210 to the frame and has an outwardly bent upper end portion 211 in the path of movement of the rod 184. The latch member 209 has a stop plate 212 attached thereto which forms a retaining shoulder for the resetting arm 213, which is pivoted on the pivot bolt 154, the latch 209 being held in engaging position with respect to the arm 213 by means of a coiled spring 214 surrounding the pivot 210 and anchored at its opposite ends to the frame and to the latch. The arm 213 has pivotally suspended therefrom a rod 215 upon which is mounted a coil spring 216 which bears at its lower end upon a plate 217 suspended from the flange 156 by bolts 218 and at its upper end against an abutment shoulder 219 formed on the rod 215 adjacent the upper end thereof. The resetting arm 213 has a portion extending above the pivot bolt 154 which is grooved on its outer side to provide at the ends of the groove abutments 220 and 221 which are engageable with a lug projecting inwardly from the lever 153 to limit the relative movement between the lever and arm whereby the lever may be shifted by said arm. The spring 216 is larger than the spring 161 which actuates the arm 163 so that upon release of the arm 213, the arm 163 will be elevated by the arm 213 to a position in which it is engaged by the latch 164 and retained in a position in which the lever 153 holds the valve 138 open between the pipes 133 and 140 thereof resetting the planetary clutch to drive the spindle head feed mechanism at the faster rate. The resetting arm 213 has an integral extension 223 extending downwardly to the flange 156 and this extension is connected by means of a link 224 to a starting lever 225. The extension 223 is connected above the flange 156 to an extension 226 of the lever 176 by means of a link 227 which is pivoted at its inner end to the extension 223 and has a slot 228 at its outer end which receives a pin 229 projecting inwardly from the arm 226.

In Fig. 15 of the drawings the parts of the valve controlling mechanism in the positions which they occupy just after the machine has been started in operation, the valves 137 and 138 being held in positions such that pressure is being supplied to both the main drive clutch operating cylinder and the planetary clutch operating cylinder. In this position the valve actuating levers 153 and 176 are retained against movement by their actuating springs 161 and 183 by means of the latches 164 and 199 and the resetting arm 213 is held in its lowermost position in opposition to its spring 215 by the retaining latch 209. As the spindle heads approach the point where the tools carried thereby come into engagement with the work on the support 7, the trip arm 151 engages with the upper end of the trip rod 172 and rocks the same inwardly about its pivot 173, this movement of the rod 172 rocking the lever 169 upon its pivot 170 in a direction to cause the lower end of the lever 169 to rock the latch 164 about its pivot 165 in opposition to its spring 167 to release the arm 163 of the lever 153 whereupon the spring 161 rocks the lever 153 inwardly about its pivot shifting the valve 138 to a position in which communication between the air supply pipe 133 and the pipe 140 leading to the planetary clutch operating cylinder 83 is cut off and the pipe 140 is opened to atmosphere to relieve the pressure in the cylinder 83. This actuation of the valve 138 causes the planetary gearing to drive the shaft 76 from which the spindle head feed mechanism is actuated through the small gears 86 and 87 at a much lower rate of speed. Thus during the inward movement of the heads they are first moved at a relatively rapid rate until the tools engage the work and then at a much slower rate during the operation upon the work. Upon continued inward movement of the heads the outer abutment 146 engages the trip lever 147 shifting the reversing clutch sleeve 98 to reverse the direction of movements to the heads. The movement of the clutch shifter through the rocking arms 193 and 186 causes the trip rod 184 to be shifted inwardly into engagement with the upper end 211 of the latch 209 which retains the resetting arm 213 in its lowermost position. Upon release of the arm 213 it is moved upwardly by the spring 216 and the lug 220 engages the projection on the lever 153 rocking the lever outwardly in opposition to the spring 161 until the arm 163 reaches a position where the latch 164 snaps into locking engagement therewith. The outward movement of the lever 153 returns the valve 138 to its original position so that air under pressure is again supplied to the planetary clutch actuating cylinder 83 reestablishing the driving connection between the large gear 72 of the planetary gearing and the shaft 76 so that during the return movement of the head it is moved at the faster rate. The upward movement of the resetting arm 213 shifts the link 227 inwardly so that the lever 176 when released will be free to move outwardly to actuate the valve 137. When the head approaches its outermost position the inner abutment head 146 engages with the trip arm 147, and again shifts the reversing clutch sleeve 98; the reverse movement of the clutch shifter causing the trip rod 84 to be shifted outwardly, the inner shoulder of the notch 194 in its outward movement engaging the dog 195 and rocking the lever 196 thus forcing the rod 204 inwardly against the projecting portion 202 of the latch 199 pushing the latch 199 clear of the arm 179 of the lever 176 whereupon the spring 183 rocks the lever 176 outwardly about its pivot shifting the valve 137 to a position in which communication between the air supply pipe 133 and the pipe 139 leading to the main clutch operating cylinder 61 is cut off and the pipe 139 opened to atmosphere to relieve the pressure within the cylinder 61 so that the main clutch is disengaged by its spring, stopping the operation of the entire machine.

When it is desired to restart the machine, it is only necessary to actuate the lever 225 in a direction to shift the downwardly projecting arm 223 of the resetting lever outwardly causing the arm 213 to be rocked downwardly until the latch 209 snaps into engagement therewith and actuating the lever 176 through the link 227 to rock the same to the position shown in Fig. 15 causing the dog 195 to enter the notch 194 of the trip rod 184 and shifting the arm 179 downwardly until the latch 199 snaps into engagement therewith, the parts of the valve controlling mechanism being thus all returned to the position shown in Fig. 15 causing the main clutch to be engaged to drive the spindles and shifting the spindle carrying heads inwardly toward the work, the above described operations being repeated. It should be noted that the automatic controlling devices affect only the feed mechanism, the spindles being rotated at the same speed and in the same direction during both the inward and outward movements of the spindle.

Means are preferably provided for directing a stream of lubricating liquid upon the work during the operation of the tools thereon, this liquid being contained between the drip pan 2 at the bottom of the machine and draining back from the work to said pan. The rotating main clutch operating cylinder 61 may be employed as a driving pulley to receive a belt 230 which extends downwardly over a pulley 213 which drives a suitable pump mounted upon a bracket 232 detachably secured to the drip pan.

Having described my invention, I claim:

1. In a machine of the character described, a supporting frame having a central work support, a series of angularly disposed ways radiating from said support, spindle carrying heads slidably mounted on said ways, racks carried by said heads and extending parallel with said ways, a gear mounted in the frame beneath the work support and coaxial therewith, a vertical shaft journaled in the frame adjacent each of said ways, said shafts having pinions at their upper ends meshing with said racks and pinions at their lower ends meshing with said gear, and means for turning said gear alternately in opposite directions.

2. In a machine of the character described, a work support, a plurality of heads mounted for movement toward and from the work support, spindles rotatably mounted in said heads, tool clamping chucks carried by said spindles, and means for simultaneously operating said chucks to clamp or release the tools.

3. In a machine of the character described, a plurality of heads mounted for movement toward and from the work support, spindles rotatably mounted in said heads, tool clamping chucks carried by the spindles at the inner ends thereof, pneumatically operated devices for operating said chucks to clamp the tools therein, and means for simultaneously controlling said pneumatically operated devices.

4. In a machine of the character described, a work support, a plurality of angularly disposed ways radiating from said support, heads slidably mounted on said ways, means for simultaneously shifting said heads toward and from the support, spindles rotatably mounted in said heads and movable therewith, shafts mounted beneath the ways and parallel therewith, bevel gears fixed to the inner ends of the shafts, said bevel gears meshing one with another to provide a driving connection between said shafts, driving connections from the said shafts to the said spindles to drive all said spindles in the same direction and driving means connected to one of said shafts.

5. In a machine of the character described, a work support, a head mounted for movement toward and from the work support with the lines of movement of adjacent heads angularly disposed at less than 180° with respect to each other, a tool carrying spindle journaled in the head, a driving member, means for driving the spindle from said driving member, mechanism for moving said head and means for operating said mechanism from said driving member, said last mentioned means including a change speed mechanism and a reversing mechanism, a movable controller for each of said mechanisms, a controller for the main driving member, means controlled by the movements of the head for operating the controllers for the change speed and the reversing mechanisms, and means controlled by successive operations of the controller for the reversing mechanism for operating the controllers for said speed change mechanism and for the main driving member.

6. In a machine of the character described, a work support, a head mounted for movement toward and from the work support, a tool carrying spindle mounted in the head, means for moving the head toward and from the work support comprising a drive shaft, a change speed mechanism and a reversing mechanism interposed between said shaft and head, a movable controller for each of said mechanisms, means carried by the head for operating said change speed mechanism controller during the inward movement of the head to reduce the rate of movement of the head, means carried by the head for operating the reversing mechanism controller and change speed mechanism controller simultaneously, and means controlled by the outward movement of the head for operating the reversing mechanism controller and simultaneously stopping the machine.

7. In a machine of the character described, a work support, a plurality of heads mounted for simultaneous movement toward and from said support, gearing for shifting said heads toward and from said work support including speed changing mechanism by means of which the heads may be moved at either of two speeds and a reversing mechanism by which the direction of movement may be changed, means for driving said mechanism, a clutch controlling the actuation of said gearing by the driving means, controllers for said speed changing and reversing mechanisms, and means carried by one of said heads for actuating said controllers, said controllers and actuating means being so disposed that the controllers are actuated in such sequence as to cause the heads to be moved inwardly first at the higher rate of speed, then at the lower rate of speed, then outwardly at the higher rate of speed and to be stopped.

8. In a machine of the character described, a work support, a plurality of heads mounted for simultaneous movement toward and from said support, gearing for shifting said heads toward and from said support, means for driving said gearing, trip operated controlling devices associated with said gearing for varying the speed of movement of the heads, reversing the movement thereof and for disconnecting said driving means to stop the heads in their outermost position, trip actuating members carried by one of the heads for operating said controlling devices, and manually operable starting means for resetting said controlling devices and connecting said driving means and shifting mechanism.

9. In a machine of the character described, a work support, a plurality of heads mounted for simultaneous movement toward and from said support, gearing for moving said heads toward and from said support including a speed changing mechanism having a shiftable controller and a reversing mechanism having a shiftable controller, means for driving said gearing, a shiftable element for controlling the operation of said driving means, means operated by one of the heads in its movements for actuating the change speed mechanism controller in one direction, said reversing mechanism controller in both directions and said controlling element for the driving means in a direction to stop the mechanism, means operated by the reversing mechanism controller for shifting the controller for the speed changing mechanism in the opposite direction, and manually operable means for shifting the controller for the driving means in a direction to start the mechanism.

10. In a machine of the character described, a work support, a plurality of heads mounted for simultaneous movement toward and from said support, a driving shaft, means operated by the shaft for moving said heads, in either direction, means for varying the speed of movement of the heads including a trip device adjacent one of the heads, means for reversing the direction of movement of the heads including a trip device adjacent said head, means carried by said head for actuating said trip devices successively, and means controlled by said reversing means for resetting said first mentioned trip device.

11. In a machine of the character described, a work support, a plurality of heads mounted for simultaneous movement toward and from said support, a driving shaft, means operated by the shaft for moving said heads in either direction, means for varying the speed of movement of the heads including a trip device adjacent one of the heads, means for reversing the direction of movement of the heads including a trip device adjacent said head, means carried by said head for actuating said trip devices successively, and means including a trip device actuated by said reversing means for resetting said first mentioned trip device.

12. In a machine of the character described, a plurality of heads mounted for simultaneous movement toward and from said support, a driving shaft, means operated by the shaft for moving said heads in either direction, means for varying the speed of movement of the heads including a trip device adjacent one of the heads, means for reversing the direction of movement of the heads including a trip device adjacent said head, means carried by said head for actuating said trip devices successively, and means including a trip device actuated by said reversing means for resetting the trip device which is actuated by the reversing means.

13. In a machine of the character described, a work support, a plurality of heads mounted for movement toward and from said support, an actuating member engaging each head for shifting the same, means for simultaneously driving each of said members comprising a shaft, means for driving the shaft, change speed mechanism associated with said shaft, reversing mechanism associated with said shaft, a clutch controlling the change speed mechanism, a clutch controlling the reversing mechanism, and means controlled by the movement of one of said clutches for operating the other of said clutches.

14. In a machine of the character described, a work support, a tool carrying head mounted for movement toward and from the support, mechanism for shifting said head, driving means, change speed and reversing mechanisms interposed between said driving means and shifting mechanism, shiftable controllers for said driving means, said change speed mechanism and said reversing mechanism, fluid operated means for actuating the controller for the driving means and the controller for the change speed mechanism, means carried by the head for actuating the controller for the reversing mechanism, valves controlling the actuation of said fluid operated means, and means controlled by the reversing mechanism controller for actuating said valves.

15. In a machine of the character described, a head, means for reciprocating the head, two fluid operated shiftable controllers, one for controlling the operation of said means and the other the rate of movement of said head, valves controlling the operation of the shiftable controllers, means controlled by the movements of the heads for actuating both of said valves, and manually operable means for actuating the valve controlling the operation of the head reciprocating means.

16. In a machine of the character described, a head, means for reciprocating the head comprising a driving member and gearing connecting said driving member and the head, said gearing including a reversing mechanism and a speed change mechanism, a shiftable controller for the reversing mechanism, a controller for the driving member, a controller for the change speed mechanism, means actuated by the controller for the reversing mechanism when the same is shifted in one direction to operate the controller for the change speed mechanism, and means actuated by the controller for the reversing mechanism when the same is actuated in the opposite direction to operate the controller for the main driving member.

17. In a machine of the character described, a head, means for reciprocating said head comprising a driving member and gearing connecting said driving member and the head, said gearing including a reversing mechanism, and a speed change mechanism, means operated by the head in its movement for controlling said speed change mechanism to change the speed of movement of the head, means operated by the head for controlling the reversing mechanism, means controlled by the reversing mechanism upon reversal of movement of the head at the inner end of its stroke for controlling the change of speed mechanism, and means controlled by the reversing mechanism at the outer end of the stroke of head for stopping the operation of the machine.

18. In a machine of the character described, a work support, a head mounted for movement toward and from the support, mechanism for shifting said head including a reversing mechanism and a change speed mechanism, means for starting and stopping said head, fluid operated means controlling the change speed mechanism, fluid operated means for controlling the starting and stopping means, fluid operated means controlling the operation of the change speed mechanism, a valve controlling the operation of the first mentioned fluid operated means, said valve when in one position causing the head to be moved by the shifting mechanism, a valve controlling the operation of the second fluid operating means, said valve in one position causing said head to be moved at one speed and in another position causing the head to be moved at another speed, releasable means for retaining the first mentioned valve in a position to cause actuation of the head, releasable means for holding the second valve in a position to cause the head to be moved at its higher speed, means actuated by the head for controlling the reversing mechanism to reverse the direction of movement of the head, means operated by the head during its inward movement to release the retaining means for said second valve, a resetting device associated with said second valve, means for releasably retaining said device in inoperative position, means actuated by the reversing mechanism controller when the same is actuated at the inner end of the stroke of the head for releasing the resetting means, means actuated by the reversing mechanism controller at the outer end of the stroke of the head for releasing the first mentioned valve, means for actuating said valves and said resetting device when the same are released, and manually operable means for resetting the first mentioned valve and said resetting device.

In testimony whereof, I hereunto affix my signature.

DAVID F. DOMIZI.